United States Patent
Huuck et al.

(10) Patent No.: US 8,869,120 B2
(45) Date of Patent: Oct. 21, 2014

(54) MULTI LANGUAGE SOFTWARE CODE ANALYSIS

(75) Inventors: Ralf Huuck, Eveleigh (AU); Felix Rauch, Eveleigh (AU); Bernard Blackham, Potts Point (AU); Sean Seefried, Eveleigh (AU)

(73) Assignee: National ICT Australia Limited, Eveleigh, New South Wales (AU)

( * ) Notice: Subject to any disclaimer, the term of this patent is extended or adjusted under 35 U.S.C. 154(b) by 858 days.

(21) Appl. No.: 12/743,695

(22) PCT Filed: Nov. 17, 2008

(86) PCT No.: PCT/AU2008/001709
§ 371 (c)(1),
(2), (4) Date: Oct. 22, 2010

(87) PCT Pub. No.: WO2009/065168
PCT Pub. Date: May 28, 2009

(65) Prior Publication Data
US 2011/0167410 A1 Jul. 7, 2011

(30) Foreign Application Priority Data
Nov. 20, 2007 (AU) .................. 2007906350

(51) Int. Cl.
*G06F 9/45* (2006.01)
*G06F 9/44* (2006.01)

(52) U.S. Cl.
CPC .. *G06F 8/53* (2013.01); *G06F 8/51* (2013.01); *G06F 8/447* (2013.01); *G06F 8/43* (2013.01); *G06F 8/436* (2013.01)
USPC ............ 717/140; 717/104; 717/117; 717/120

(58) Field of Classification Search
CPC .............. G06F 8/10; G06F 8/20; G06F 8/41; G06F 8/43; G06F 8/71
USPC .......................................... 717/124
See application file for complete search history.

(56) References Cited

U.S. PATENT DOCUMENTS

| | | | |
|---|---|---|---|
| 5,815,719 A | 9/1998 | Goebel | 395/707 |
| 6,134,707 A * | 10/2000 | Herrmann et al. | 717/139 |
| 6,247,174 B1 | 6/2001 | Santhanam et al. | 717/9 |
| 6,314,557 B1 * | 11/2001 | Shenderovich | 717/114 |
| 6,314,562 B1 * | 11/2001 | Biggerstaff | 717/156 |

(Continued)

FOREIGN PATENT DOCUMENTS

EP     0 678 810     10/1995

OTHER PUBLICATIONS

M. Ward, WSL Programmer's Reference Manual, 2002, 39 pages.*
Pu et al., Reusing Legacy COBOL Code with UML Collaboration Diagrams via a Wide Spectrum Language, 2005, 6 pages.*

(Continued)

*Primary Examiner* — Thuy Dao (57) ABSTRACT

The invention concerns a method, a computer, and software for analysis of software code that includes code written in multiple languages. A static analysis on source code of an embedded system that has source code written in a low-level language embedded within a high level language is accompanied by transforming the embedded low level language source code to a common high level representation for performing the static analysis. This transformation only retains sufficient semantic meaning of the low level source code necessary to perform the static analysis.

14 Claims, 7 Drawing Sheets

(56) References Cited

U.S. PATENT DOCUMENTS

| | | | |
|---|---|---|---|
| 7,237,233 B2* | 6/2007 | Knueven et al. | 717/140 |
| 7,500,230 B2* | 3/2009 | Edwards et al. | 717/141 |
| 7,530,061 B2* | 5/2009 | Santhanam et al. | 717/157 |
| 8,091,070 B2* | 1/2012 | Meijer et al. | 717/117 |
| 8,312,432 B2* | 11/2012 | Mori | 717/127 |
| 8,689,183 B2* | 4/2014 | Liang | 717/120 |
| 8,713,514 B2* | 4/2014 | Winternitz | 717/104 |
| 2004/0123276 A1* | 6/2004 | Knueven et al. | 717/140 |
| 2004/0221262 A1 | 11/2004 | Hampapuram et al. | |
| 2004/0264367 A1 | 12/2004 | Edwards | |
| 2005/0015752 A1 | 1/2005 | Alpern et al. | |
| 2005/0273860 A1 | 12/2005 | Chess et al. | |
| 2006/0143594 A1 | 6/2006 | Grimaldi | |
| 2007/0055966 A1* | 3/2007 | Waddington et al. | 717/144 |
| 2009/0307664 A1* | 12/2009 | Huuck et al. | 717/124 |
| 2011/0035734 A1* | 2/2011 | Liang | 717/140 |

OTHER PUBLICATIONS

Kats et al., Mixing source and bytecode: a case for compilation by normalization, Oct. 2008, 17 pages.*

Cristina Cifuentes et al., "Computer Security Analysis through Decompilation and High-Level Debugging", Oct. 2001, 6 pages.

Bastian Schlich et al., "Model Checking C Source Code for Embedded Systems", Sep. 2005, 13 pages.

M.P. Ward, "Pigs from Sausages? Reengineering from Assembler to C via FermaT Transformations", Software Technology Research Laboratory, De Montfort University, Leicester, Apr. 23, 2003, 36 pages.

PCT International Search Report and Written Opinion of the International Searching Authority, Australian Patent Office, Application No. PCT/AU2008/001709, Dec. 9, 2008, 9 pages.

Katsumata et al., "Proof-Directed De-compilation of Low-Level Code", Proceedings of the $10^{th}$ European Symposium on Programming Languages and Systems, 2001, pp. 352-366.; Apr. 2001.

* cited by examiner

```
int f(int a, int b)
{
    int c;

asm(
        "rsb     r3, %[a], %[a], asl #3    \n"   /*  a*7              */
        "rsb     r3, r3, r3, asl #4        \n"   /*  (a*7)*15         */
        "add     %[a], %[b], %[b], asl #3  \n"   /*  b*9              */
        "add     %[a], %[b], %[a], asl #3  \n"   /*  b*9*8 + b        */
        "add     %[c], r3, %[a]            \n"   /*  result in c      */
        : [c] "=r" (c)                           /* output register   */
        : [a] "r" (a), [b] "r" (b)               /* input registers   */
        : "r3" );                                /* clobber register  */ return c;
}
```

Fig. 3

```
int f(int a, int b)
{
    int c;

int asm_operand_0;   /* output register */
    int asm_operand_1, asm_operand_2;   /* input registers */
    int asm_operand_3;   /* temporary variable for clobber register */
    asm_operand_0 = a;
    asm_operand_1 = b;

/* Start C transformation */
    asm_operand_3 = asm_operand_1 *  8 - asm_operand_1;
    asm_operand_3 = asm_operand_3 * 16 - asm_operand_3;
    asm_operand_1 = asm_operand_2 *  8 + asm_operand_2;
    asm_operand_1 = asm_operand_1 *  8 + asm_operand_2;
    asm_operand_0 = asm_operand_3 + asm_operand_1;
    /* End C transformation */ c = asm_operand_0;

return c;
}
```

Fig. 4

```
int f(int x)
{
  int i, y;

asm(" mov %[reg_i], #1                        \n"
      " cmp %[reg_i], %[reg_x]                  \n"
      " bge .end                                \n"
".loop: add %[reg_i], %[reg_i], #1              \n"
      " mul %[reg_y], %[reg_x], %[reg_y]        \n"
      " add %[reg_i], %[reg_i], #1              \n"
      " cmp %[reg_i], %[reg_x]                  \n"
      " blt .loop                               \n"
      ".end: \n" :
      [reg_y] "+r" (y),
      [reg_i] "+r" (i):
      [reg_x] "r" (x)
      );

return y;
}
```

Fig. 5

```
int f(int x)
{
  int i, y;

i = 1;
  if(i >= x ) goto end;
loop:
  i++;
  y = x * y;
  i++;
  if(i < x ) goto loop;
end:
  return y;
}
```

Fig. 6

```
int f(int x)
{
  int i, y;

for(i = 1; i < x; i++) {
    i = i + 1;
    y *= x;
  } return y;
}
```

Fig. 7

MULTI LANGUAGE SOFTWARE CODE ANALYSIS

CROSS-REFERENCE TO RELATED APPLICATIONS

The present application claims priority from Australian Provisional Patent Application No 2007906350 filed on 20 Nov. 2007, the content of which is incorporated herein by reference.

TECHNICAL FIELD

The invention concerns the analysis of software code that includes code that is written in multiple languages. In particular the invention concerns, but is not limited to, a method of performing static analysis on source code that has source code that is written in a different language embedded within it. Aspects of the invention include a method, a computer system and software.

BACKGROUND ART

Software product development is very much driven by two objectives: Short time-to-market and low development costs. However, the current best practice of software development is still expensive, time consuming, and creates unnecessary expenses which often occur in later stages of product development or even after product deployment. One of the reasons is errors or flaws in the software's source code (i.e. software bugs) which are both expensive and time consuming to detect. Finding such software bugs, or in turn giving an insurance of their absence, is therefore of great importance in software development.

One area where it is particularly important to detect bugs early in the development cycle is embedded systems. An embedded system is a special-purpose system in which the computer is completely encapsulated by the device it controls. Unlike a general-purpose computer, such as a personal computer, an embedded system performs one or a few predefined tasks, usually with very specific requirements. Examples are mobile phones, ATMs, medical devices, and engine controllers. The importance of bug-free software on such devices is given by their often safety or mission-critical application and the enormous costs which a potential recall for a bug fix would entail.

It is characteristic for embedded system software development that several programming languages are used in an intertwined manner. A high level language such as C or C++ is used to program the overall control behaviour of the device, while embedded in the C/C++ code there are often fragments of low level languages, notably assembly, to enable direct access to the device's hardware.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY OF INVENTION

In a first aspect the invention provides a method of performing static analysis on source code having a low level language source code embedded in a high level language source code, wherein the high level language source code is represented in a high level representation that the static analysis can be performed on, the method comprising the steps of:
 transforming the embedded low level language source code to the high level representation that the static analysis can be performed on; and
 performing static analysis on the high level representation of the high level language source code and the high level representation of the low level source code.

Complete static analysis of source code requires an understanding of the high level language source code as well as the embedded low level language source code. The inventors have identified that it is not sufficient to understand the languages separately by analysing them one at a time. Since the code of the different languages interact both must be analysed together. By transforming both languages to the same high level representation one coherent analysis can be performed. By performing the static analysis on a high level representation of the languages, information about program structure (e.g. compare the structure of loops, jumps, and branches in source code) and variable types (e.g. compare integer and boolean) are not lost and can be included in the static analysis.

Further, using the invention any improvements of the underlying static analysis technology can be applied to all languages with reduced effort. Since there is likely to be more changes in analysis technology rather than in programming languages themselves, this is an also important cost saver.

The step of transforming the embedded low level language source code to the high level representation may comprise transforming in a way that does not retain the full semantics of the low level language source code. In particular, transforming instructions in the low level language source code that have no equivalent in the high level representation in a way that does not retain all the semantics of those instructions.

This embodiment of the invention represents a realisation that to perform static analysis on source code it is not necessary to maintain the entire semantics of the low level source code. This is at complete odds with the understanding of checking code. Verification analysis requires all meaning be maintained for all languages present in the source code. The only way to achieve this is by converting the code to the lowest common denominator of the languages. This means the analysis is performed on the low level language and the range of types of analysis that can now be performed on the code is significantly reduced. By realising the it is not necessary to retain the entire semantics of the low level source code, the inventors have inventive a new way of approaching the problem. It is this realisation that allowed the inventors to also discover that this enables them to covert the code to a high level representation to achieve a greater range of analysis, but at the same time taking account of the features of the embedded low level language in the statistic analysis where necessary.

The step of transforming the embedded low level language source code to the high level representation may comprise the steps of:
 identifying one or more instructions in the low level language source code that have no equivalent in the high level representation; and transforming the one or more instructions to the high level representation in a way that represents the effects the instruction have on the source code.

The step of transforming the embedded low level language source code to the high level representation may comprise the steps of:

identifying one or more instructions in the low level language source code that have no equivalent in the high level representation; and transforming the one or more instructions by transforming them to the high level representation in a way that represents the only substantially effects the instruction has on the source code.

Instructions that have no equivalent in the high level representation may be instructions that provide direct access to the hardware that include one or more of:

Read or modify the stack pointer (sp);
Modify the program counter (pc);
Read or modify special (co-)processor registers;
Set new page table;
Flush cache;
Enable or disable cache; or
Enable or disable interrupts.

The step of transforming the embedded low level language source code to the high level representation may comprise the steps of:

identifying any variables and registers used in the low level language source code; and declaring the identified variables and/or registers in the high level representation. This means that the interface that maps between the high level language and the low level language is also included in the high level representation that is then analysed.

The step of transforming the embedded low level language source code to the high level representation may comprise the steps of:

identifying a set of instructions in the low level language source code that represent a single high level statement in the high level representation; and transforming the set of instructions to represent the single high level statement in the high level representation.

The method further may comprise the step of transforming the high level language source code to the high level representation that the static analysis can be performed on.

The high level representation may be an abstract syntax tree. The high level source code may be, substantially the same as the high level representation.

The method may further comprise the step of using the static analysis of the high level representation to do one or more of the following:

identify errors in the source code;
determine worst case execution time of the source code;
determine security risks of the source code;
determine correct implementation of access policies in the source code;
determine memory consumption of a device performing the instructions of the source code;
determine the battery consumption of a device performing the instructions of the source code; and
determine information describing the nature of the source code, such as statistics and structure.

The source code may be for use in an embedded system. The embedded low level language source code may be architecture and hardware specific.

In another aspect the invention provides software, that is, computer executable instructions stored on a computer readable medium that when installed on a computer, causes the computer to operate in accordance with the method described above.

In yet another aspect the invention provides a computer system having software installed, to cause the processor of the computer to perform the method described above.

BRIEF DESCRIPTION OF DRAWINGS

An example of the invention will now be described with reference to the accompanying drawings, in which.

BEST MODE FOR CARRYING OUT THE INVENTION

For the purpose of program analysis, higher level languages are typically better suited as they contain more structure and more information. For instance, high level C/C++ programs have a lot of structural and type information such as conditional loops, objects, and ranges of arrays, while low level assembly programs do not have this information at all or is not readily available.

However, in an embedded system environment there is often a mixture of languages, in particular, low level program fragments (e.g. assembly) are embedded in high level programs (e.g. C/C++).

In the past to overcome this problem, analysis has been limited to one language. This solution simply ignores one language and the analysis does not take account any impact the ignored language has on the source code. While limiting the analysis to one language is clearly unsatisfactory it is currently used in many commercial static analysis tools. Alternatively, separate analysis has been performed for the low level language and the high level language separately, and the results then merged. This second solution requires independent static analysers to be built which almost doubles the effort required in providing a static analysis solution.

In this example, we denote the part of the source code that comprises the program that is written in the low level language as $P_{low}$ and the part that is written in the high level language as $P_{high}$. Programs are typically defined by their source code representation. For program analysis and compilation purposes, this source code is stored in some internal format, often in the form of an abstract syntax tree (AST). For the remainder, we assume that $P_{low}$ is represented in the AST $AST_{low}$ and $P_{high}$ in the AST $AST_{high}$. In alternate embodiments the internal formal representation of the source code need not be in the form of an AST. Other suitable formats used in analysis and compilation can also be used, such as the source code or a similar form where the code is in a machine readable form upon which the analysis can be performed.

Figure 1:
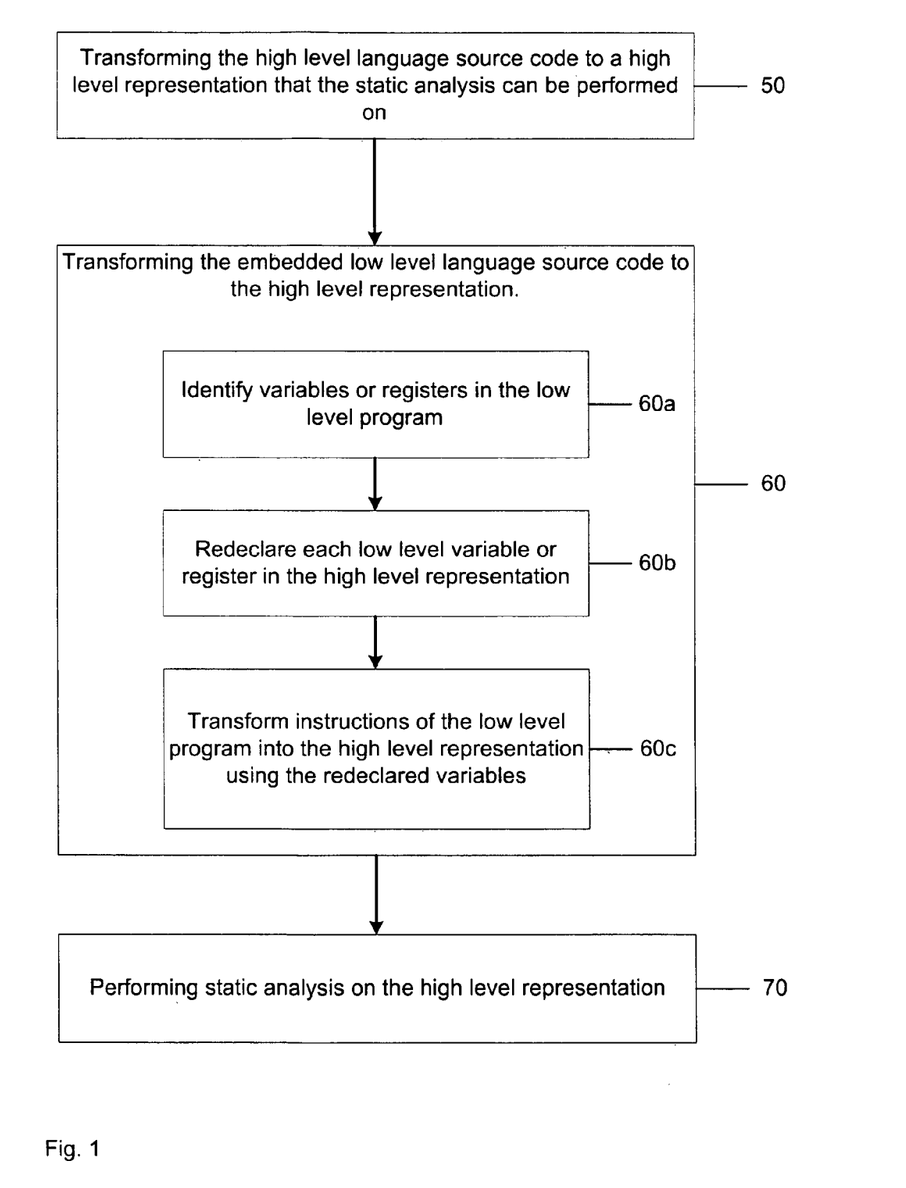
FIG. 1 is a flow chart showing the method for transforming source code having a low level language source code embedded in the high level source code.

An example of a method of the invention for transforming source code having a low level language source code $P_{low}$ embedded in a high level source code $P_{high}$ will now be described with reference to the flow chart of FIG. 1.

Initially, the method comprises transforming 50 the high level program's statements $P_{high}$ into a high level representation upon which the static analysis can be performed on. The high level representation and the high level programming language $P_{high}$ may be quite similar which simplifies this transformation step. Alternatively, the high level representation and the high level programming language may in fact be the same removing the need to perform this step.

Next, the method comprises transforming 60 the embedded low level program's statements $P_{low}$ into the same high level representation used in step 50.

To do this, initially all the low level variables or registers $v_{low;i}$ used in the embedded low level program are identified 60a.

For each low level variable or register $v_{low;i}$ a new fresh variable $v_{high;i}$ in the common high level representation is declared.

Then, one or more low level instructions is transformed 60c to one or more statements in the common high level representation, where each low level variable $v_{low;i}$ is substituted by the corresponding new variable $v_{high;i}$. Where possible, common sequences of low level instructions are combined into a single high level statement.

Finally, static analysis is performed 70 on the combined high level representation of $P_{low}$ and the $P_{high}$. The static analysis can be used:

- To identify potential errors in the underlying source code.
- To identify worst case execution time. One important aspect of software running on an embedded system is that it typically has real-time requirements. This means that it has to react within a certain time, finish a task in a certain time and, generally, has to behave predictably with regard to its run time. This is typically investigated by assigning timing behaviour to individual instructions or program segments and then computing their interdepended effects. The static analysis can be used to ease some problems for the analysis of timing behaviour for embedded code.
- To investigate security risks of code and the correct implementation of specific access policies. In this context security is taken to have a broader context. Firstly, in terms of using secure programming constructs and by avoiding security holes (such as potential buffer overruns) due to sloppy programming. Secondly, to investigate if the code implements some user or system-specific security policies.
- To determine memory/power consumption. Embedded devices have typically strictly limited resources with regard to available memory or the amount of power they can consume. The software running on an embedded system has to take care of this. Based on the static analysis of the invention a prediction can be made about the amount of memory/power it will consume. This is similar to worst case execution time analysis.
- Program Information Retrieval. In particular in large software projects it is important to retrieve information about the source code structure, the occurrences of variables, or simply the occurrences and relations of specific source code constructs. Based on the static analysis it is possible to retrieve any such information from a program independent of its language. This is in particular valuable for refactoring of source code, debugging, and code complexity analysis.

Figure 2:
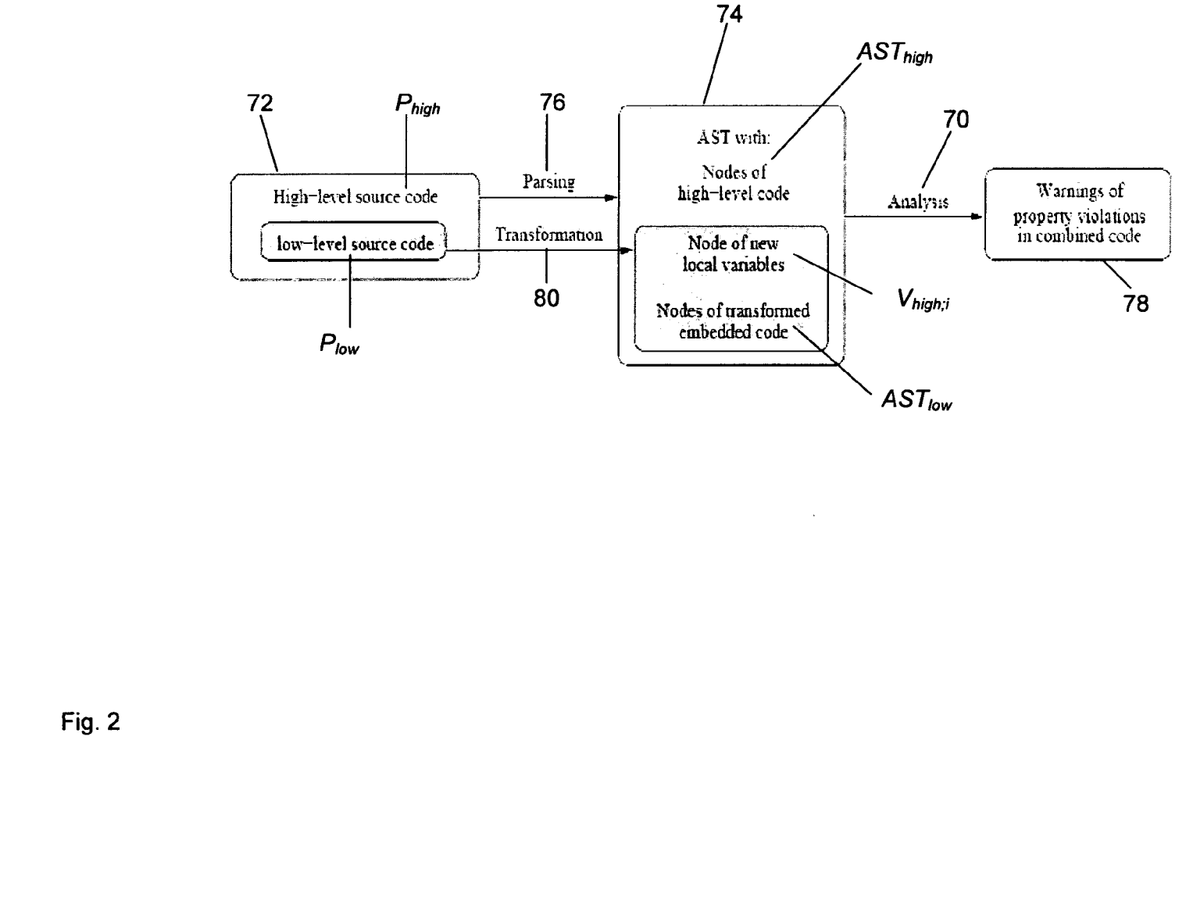
FIG. 2 shows the schematic architecture of the method of static analysis.

This method is also shown schematically in FIG. 2. First, the original source code 72 which is a combination of high level source code $P_{high}$ and embedded low level source code $P_{low}$ must be transform 50 and 60 into a form on which static analysis can be done. In this example the common high level representation is an AST 74. The high level part $P_{high}$ of the source code is parsed 76 into nodes of an AST $AST_{high}$. The embedded low level part $P_{low}$ is also parsed, then transformed 80, and corresponding nodes $AST_{low}$ are finally added to the AST 74. Part of the translation 80 is also to generate new nodes $v_{high;i}$ in the $AST_{low}$ for the local variables that are introduced due to the embedded code's low level variables or registers $v_{low;i}$. The final AST 74 thus comprises nodes reflecting the original high level code $P_{high}$, nodes for the newly introduced local variables, as well as nodes for the transformed low level instructions. This AST 74 is then used to run 70 the program analysis, which in this example will create warnings of property violations in the original source code 78.

To better exemplify the invention a more detailed example will now be described where the high level language is C/C++ and the low level language is assembly. The approach would work similarly for other language combinations. For simplicity and clarity, we also use C/C++ as the common high level representation, even though the common high level representation could be slightly different.

Figure 3:
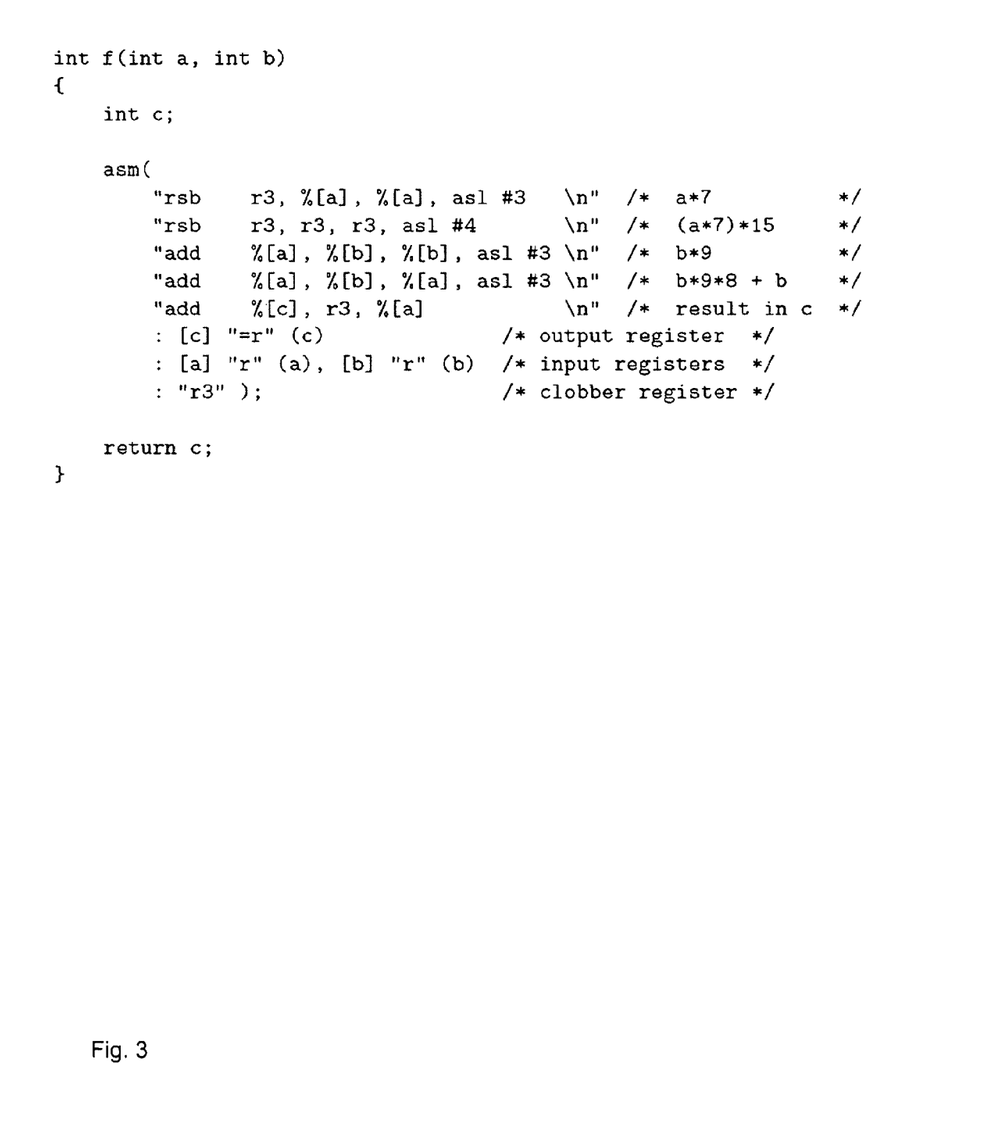
FIG. 3 is a first example of an embedded assembly program.

In this first example we refer to the function shown in FIG. 3. This function is a C function with an embedded ARM (Advanced RISC Machine) assembler part that implements the function f(a; b)=105a+73b in a highly optimised way avoiding potentially slow multiplication instructions. In practice, a function like this could be used if the function is performance critical because it is called many times and the specific processor does not offer fast multiplication instructions. In the embedded assembly block (introduced by the keyword asm), there are five assembler instructions that implement the specific arithmetic, as well as an interface description. The interface description tells the compiler which C variables (in this case c) and parameters (in this case a and b) map to which assembler registers, as well as which registers (in this case r3) are used ("clobbered") inside the assembler block.

Transforming the function of FIG. 3 in a straight-forward way no process is required to perform step 50 since C/C++ is used in this example as the common high level representation.

Next, step 60 is performed. For each identified low level variable and register 60a, a local C variable assembly operand is redeclared 60b. More specifically, the method introduces asm_operand_0 for the output register from the assembly block that will be copied into variable c. asm_operand_1 and asm_operand_2 are declared for the two input registers to the assembly block that will contain copies of the parameters a and b. Finally a local C variable asm_operand_3 is introduced that will be used for the clobbered register r3.

Figure 4:
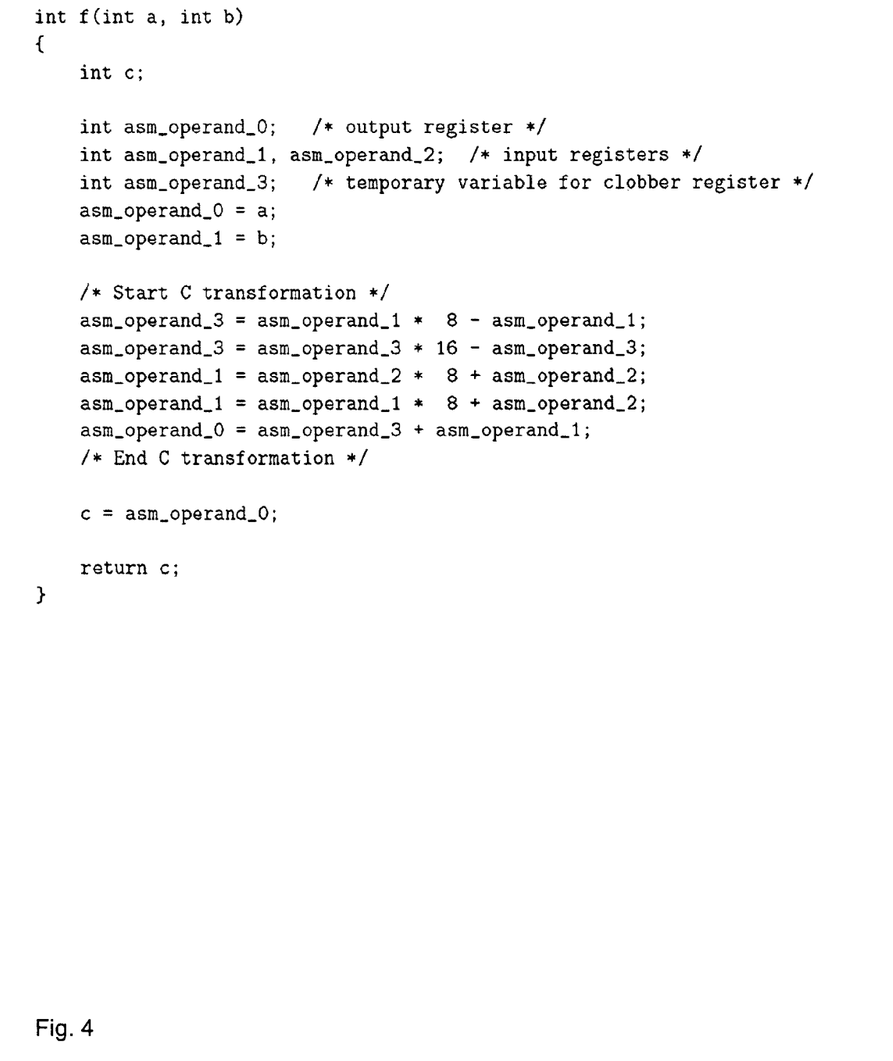
FIG. 4 is the assembly program of FIG. 2 translated into C using the invention.

The method then transforms the assembly instructions to corresponding C statements 60c. For example, an add instruction (like the last add instruction in the FIG. 3) is transformed into an assignment statement with an addition term on the right-hand side as follows:

ARM assembly: add $r_d, r_{op1}, r_{op2} \rightarrow C: r_d = r_{op1} + r_{op2}$ The slightly more complex rsb instruction ("reverse subtract") with the arithmetic-shift operand (like the first rsb instruction in the FIG. 3) is transformed to C as follows:

ARM assembly: rsb $r_d, r_{op1}, r_{op2}, asl\#i \rightarrow C:$
$r_d = r_{op2} * 2^i - r_{op1}$ Transforming the whole function of FIG. 3 in the same straight-forward way leads to the function shown in FIG. 4. In the example, the assembly registers are replaced with corresponding C variables that are named asm_operand_n, where n is the number of the operand in the interface description.

This transformation to a high level representation allows us to check that the parameters a and b are actually used, that the variable c is correctly initialised within the assembly block and that the compiler knows about all registers that are actually used within the assembly block. This helps identify any errors that are based on the relationship between the embedded code and the higher level program.

This first example represents a simple implementation of the method. Processing for step 50 was not required. Further, every low level language construct is directly translated into a corresponding high level language construct. That is, one assembly instruction is transformed into one corresponding C statement.

A more advanced implementation of the invention recognises that certain combinations of low level language constructs actually implement a more complex high level language construct. For example, it is often impossible to implement a high level language's more complex control-flow statements like if-then-else or loop statements in a single low level language instruction and hence, multiple low level language instructions are required to implement such high level constructs. Such a combination of multiple low level language constructs can thus be collated into a single high level language construct when transforming the low level language into the high level language in step 60.

As an example, a simple if-then control-flow statement cannot be implemented in a single instruction in most modern assembly languages, because it is composed of a separate comparison and a branch part respectively. Hence, the control-flow structure must be implemented in multiple assembly instructions. However, these assembly instructions will look quite similar most of the time. It will include some form of a comparison instruction followed by some form of a branch instruction. These combinations of instructions can be detected and transformed accordingly. For example, the following ARM instruction sequence implements an if-then statement (without the actual expression evaluated within the if ( )):

```
cmp r₁, op₂
bcc label
...
label:
etc.
```

This pattern can be matched and transformed into an if-then statement as follows:

```
if(r₁ cmop-op op₂) {
...
}
etc.
```

Where the cc designates the specific condition codes and comp-op the corresponding compare operation.

Figure 5:
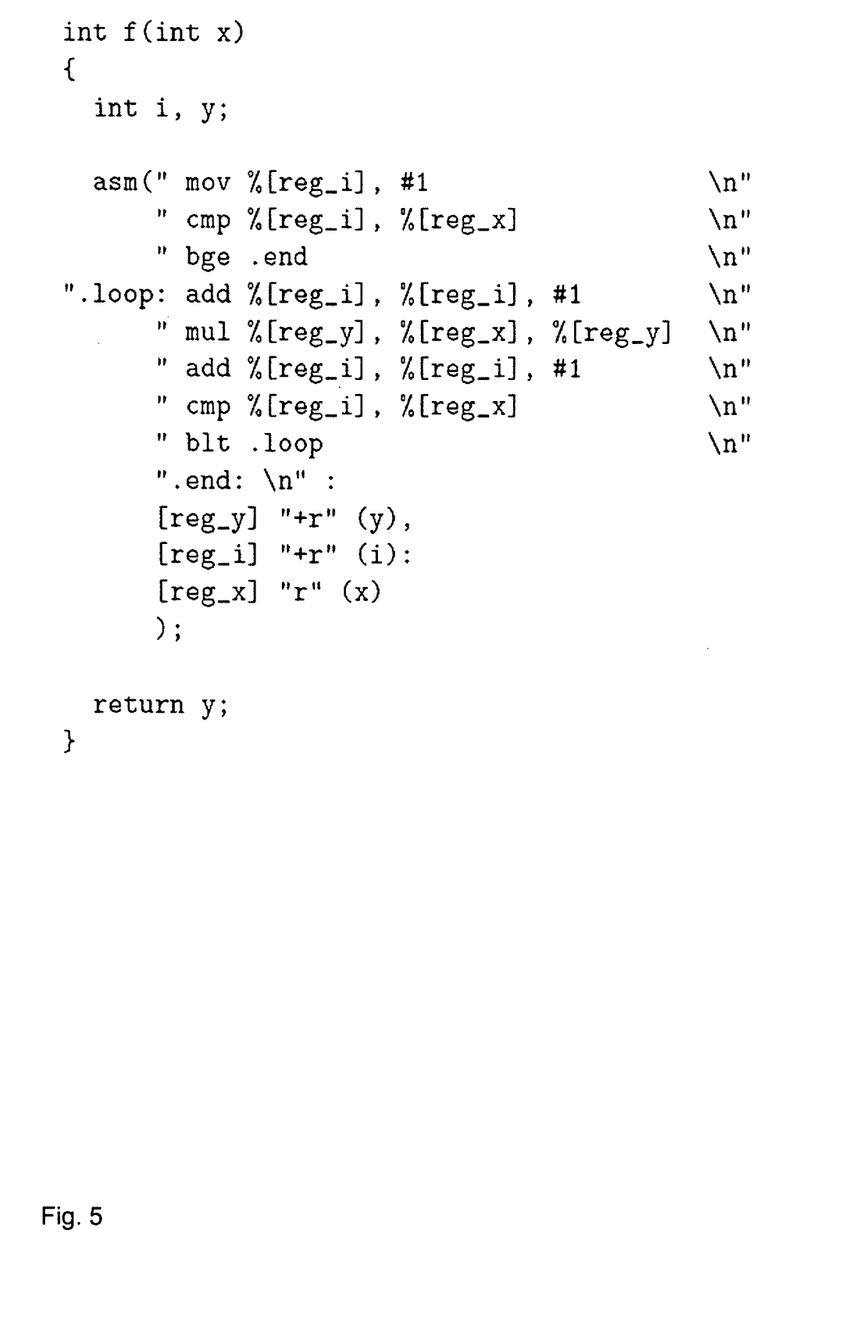
FIG. 5 is a second example of an embedded assembly program.
Figure 6:
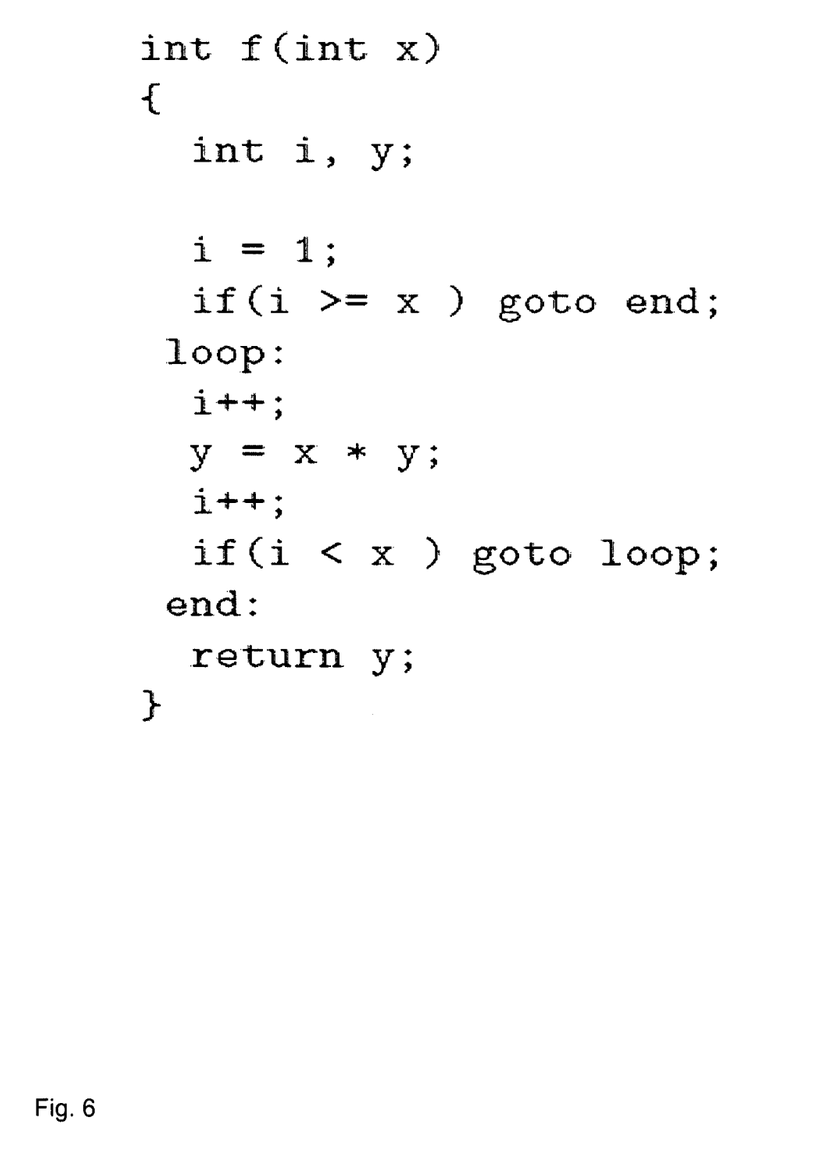
FIG. 6 is the assembly program of FIG. 5 translated (simply) into C using the invention.
Figure 7:
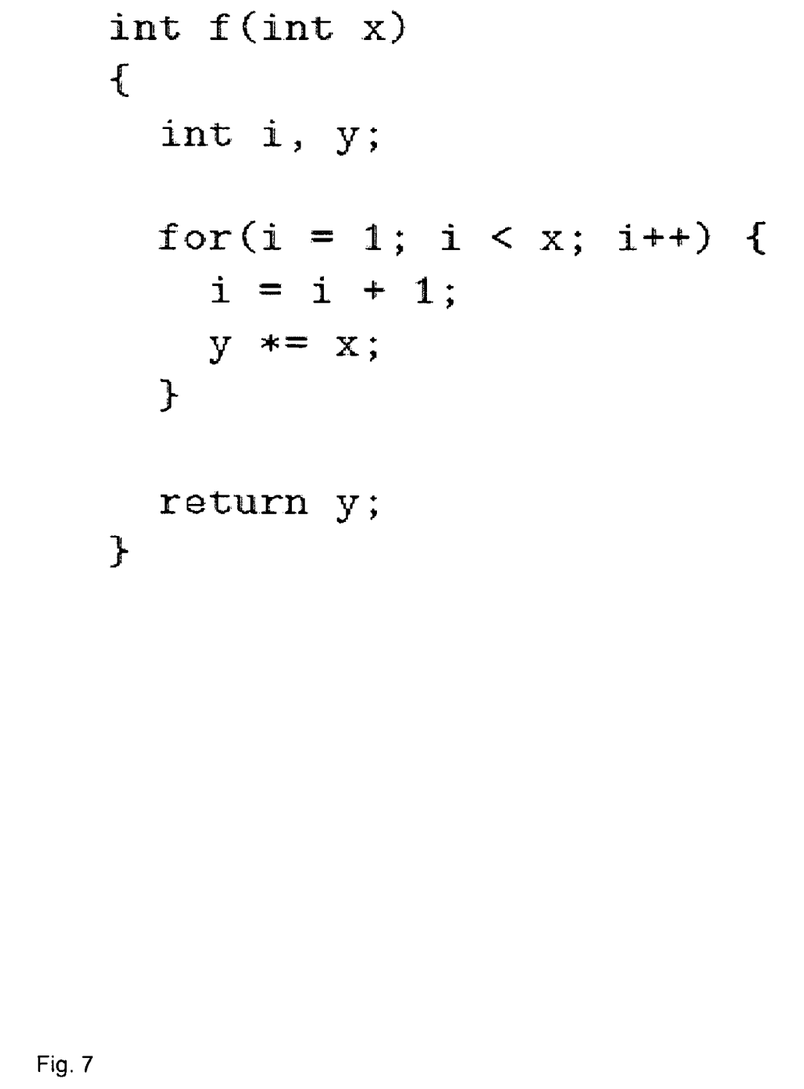
FIG. 7 is the assembly program of FIG. 5 translated (advanced) into C using the invention.

This advanced implementation will be described with reference to a third example program as shown in FIG. 5. The embedded ARM assembly part of the program implements a for loop construct. A simple transformation of the assembly code to C as described with the first example leads to a C program depicted in FIG. 6. While the C program of FIG. 6 is a correct transformation, it does not reflect the true structure of the original embedded assembly program. The more advanced technique detects that the assembly code actually implements a for-loop construct and transforms the code accordingly, as shown in FIG. 7. For example, the detection may be based on looking for a pre-defined pattern, such as a specification combination of CMP (compare) and BLT (jump) instructions which can be transformed to a if-then-else statement in this high language representation.

By transforming the low level code to the high level and thereby detecting the loop structure, the subsequent static analysis of the high level code can include loop-related checks at step 70. This includes detecting that the loop variable i of the loop is modified inside the loop's body.

The examples also show that by analysing the high level representation of the combined code, our technique correctly detects that variable i and parameter x are actually used in the function, and variable y is correctly assigned a value before using it to return the result of the function. Without the method of the invention of transforming the embedded low level code to the high level representation, such variables and parameters that are used in the embedded assembly part would either have to be ignored completely, or result in false positives.

One important reason for embedding low level code into a higher level language in systems code is that special instructions are required for certain tasks. Frequent examples of such tasks are to:

Read or modify the stack pointer (sp)
Modify the program counter (pc)
Read or modify special (co-)processor registers
Set new page table
Flush cache
Enable or disable cache
Enable or disable interrupts Since there is no corresponding statement for these instructions in high level languages such as C/C++, our technique transforms them into statements that express enough about their effects to make them meaningful for the static analysis. In this way the transformation of the embedded code need not be exact. For example, an instruction that reads the stack pointer into a local variable is transformed into a statement that assigns a specially marked value to that local variable:

ARM assembly: mrs r1,sp→C:asm_operand_1=UNKNOWN_VALUE;

Where asm_operand_1 corresponds to register r1 and UNKNOWN_VALUE means "some value that we do not know" for the purpose of the analysis. The analysis then at least knows that asm_operand_1 has been assigned a value and thus suppresses false warnings about the variable not being initialised properly, that would be detected falsely without our interlanguage analysis.

As a second example we take an instruction that writes the value of a local variable into a special co-processor register. Such an instruction is transformed into a statement that just reads that local variable:

ARM assembly: mrc p15,0,r1,c7,c0,0→C:(void)asm_operand_1;

Where p15 is the co-processor register and r1 is the main processor's register that corresponds to the local variable into which the results is written (the other operands are not important here). Even though the transformed C statement has no visible effect, it is still useful for the analysis because it illustrates that the variable's value is actually used, again preventing false positives.

As a final example we take a short instruction sequence that disables interrupts. This instruction sequence is detected with the advanced transformation technique and then transformed into a special high level statement that expresses the same effect:

ARM Assembly:

```
mrs r0, cpsr
orr r0, r0, #0xd0
msr cpsr_c, r0 → C: special_stmt(cli);
```

The special statement is a statement that may not exist in a real high level language, but inserting it into the high level representation allows us to nevertheless check for properties that relate to the original effect, for example checking that interrupts are always turned back on after they have been turned off. This is only possible through the interlanguage analysis method outlined here.

The invention may be provided as software. When the software is installed on a computer system the processor causes executes the instructions of the software to cause the computer system to perform the method described above. The computer system can be distributed. The computer includes an input device to receive and store the source code. The computer also include storage means to store the received source code and the software. An output device of the computer, such as a monitor, is provided to present a user interface to the user. Using the interface the user can cause the static analysis to be performed on the source code and the result of the static analysis is presented to the user on the interface. Parts of the method can be performed as the user is writing the source code. Alternatively, the method may be performed during compile time. The computer system can be distributed.

The advantage of the invention as described in one or more of the examples above includes:

The overall improvement of the proposed method enables a convenient analysis of interlanguage code where one language is embedded in the other. It prevents the embedded code being considered a "blind spot" without the loss of information/precision. Working on the higher level enables the analysis to make use of structural and type information that would otherwise be lost.

The need to have separate analyzers for separate languages is removed. As all languages are translated into a common format we use the same analysis on this common format for all languages. This saves time in analysis development, makes the overall approach more consistent and more reliable, and enables a quick adaption of new checks.

It will be appreciated by persons skilled in the art that numerous variations and/or modifications may be made to the invention as shown in the specific embodiments without departing from the scope of the invention as broadly described. The present embodiments are, therefore, to be considered in all respects as illustrative and not restrictive.

Claims defining the invention are as follows:

1. A method executed by a processor for performing static analysis on source code having a low level language source code embedded in a high level language source code, wherein the high level language source code is represented in a high level representation that the static analysis can be performed on, the method comprising the steps of:
    transforming the embedded low level language source code to a high level representation that does not retain the full semantics of the low level language source code and that the static analysis can be performed on, by
    identifying a set of instructions in the low level language source code that represents a single high level statement in the high level representation, and transforming the set of instructions to represent the single high level statement in the high level representation; and
    performing static analysis on the high level representation of the high level language source code and the high level representation of the low level source code.

2. The method of claim 1, wherein transforming comprises transforming one or more instructions in the low level language source code that have no equivalent in the high level representation in a way that does not retain all the semantics of those one or more instructions.

3. The method according to claim 2, wherein instructions that have no equivalent in the high level representation are instructions that provide direct access to the hardware that includes any one or more of:
    read or modify the stack pointer (sp);
    modify the program counter (pc);
    read or modify special (co-)processor registers;
    set new page table;
    flush cache;
    enable or disable cache; or
    enable or disable interrupts.

4. The method according to claim 1, wherein the step of transforming the embedded low level language source code to the high level representation comprises the steps of:
    identifying one or more instructions in the low level language source code that have no equivalent in the high level representation; and
    transforming the one or more instructions to the high level representation in a way that represents only effects these instructions have on the source code.

5. The method according to claim 1, wherein the step of transforming the embedded low level language source code to the high level representation comprises the steps of:
    identifying any variables and registers used in the low level language source code; and
    declaring the identified variables and/or registers in the high level representation.

6. The method according to claim 1, wherein the method further comprises the step of:
    transforming the high level language source code to the high level representation that the static analysis can be performed on.

7. The method according to claim 1, wherein the high level representation is an abstract syntax tree.

8. The method according to claim 1, wherein the type of high level source code is the same as the high level representation.

9. The method according to claim 1, wherein the step of performing static analysis of the high level representation comprises one or more of the following:
    identify errors in the source code;
    determine worst case execution time of the source code;
    determine security risks of the source code;
    determine correct implementation of access policies in the source code;
    determine memory consumption of a device performing the instructions of the source code;
    determine the battery consumption of a device performing the instructions of the source code; and
    determine information describing the nature of the source code, such as statistics and structure.

10. The method according to claim 1, wherein the source code forms part of an embedded system.

11. The method according to claim 1, wherein the embedded low level language source code is architecture and hardware specific.

12. The method according to claim 1, further comprising the step of installing the source code in an embedded system.

13. Software, that is computer executable instructions stored on a non-transitory computer readable medium that when installed on a computer, causes the computer to operate in accordance with the method of claim 1 or claim 9.

14. A computer system having software installed in a memory, to cause a processor of the computer system to perform the method of claim 1.

* * * * *

UNITED STATES PATENT AND TRADEMARK OFFICE
CERTIFICATE OF CORRECTION

| | | |
|---|---|---|
| PATENT NO. | : 8,869,120 B2 | Page 1 of 1 |
| APPLICATION NO. | : 12/743695 | |
| DATED | : October 21, 2014 | |
| INVENTOR(S) | : Huuck et al. | |

It is certified that error appears in the above-identified patent and that said Letters Patent is hereby corrected as shown below:

On the Title Page:

Item [75] Inventors Should read:   Ralf Huuck, Eveleigh (AU); Felix Rauch, Eveleigh (AU); Bernhard Blackham, Potts Point (AU); Sean Seefried, Eveleigh, (AU)

Signed and Sealed this

Twenty-fourth Day of March, 2015

Michelle K. Lee
*Director of the United States Patent and Trademark Office*